2,893,898
METHOD OF RENDERING MATERIALS WATER-REPELLENT

John Gwynant Evans, Menston-in-Wharfedale, and William Salkeld Meals, Bradford, England, assignors to Bradford Dyers' Association Limited, Bradford, England, a company of Great Britain No Drawing. Application April 30, 1956
Serial No. 581,341

17 Claims. (Cl. 117—161)

This invention comprises improvements in respect of imparting water-repellent properties to materials, more particularly textile materials consisting of or containing natural, regenerated or modified cellulose, or natural, regenerated or modified protein, or substances of synthetic origin, and fibrous materials e.g. felt, paper and fibre board. The invention is also applicable to leather and fur. Further, the invention is applicable to materials which are non-porous, or substantially non-porous, e.g. glass, ceramics, metals, plastics and wood.

It is known that various materials and especially fibrous materials can be made water-repellent by a variety of treatments. Such treatments include the application of salts of aluminium or zirconium, alone or in conjunction with waxes or fatty bodies, the use of waxes alone, as for example, paraffin wax, and the use of a wide range of organic fatty bodies usually containing a long hydrophobic chain attached to an organic residue and capable of decomposition or reaction under the influence of heat.

It is also known that the deposition of various organosilicon compounds on the surface of materials normally non-water-repellent confers the property of water-repellency. The deposition of such organosilicon compounds for this purpose has hitherto been carried out in a variety of ways including application from the vapour phase, from the liquid phase, from solution in an inert organic solvent, from aqueous solution, from aqueous dispersion or emulsion, or in the form of a paste or grease.

Amongst organosilicon compounds which have been used are those which consist of hydrolyzable organosilanes or the products of hydrolysis of said hydrolysable organosilanes, said hydrolyzable organosilanes containing organic groups linked to the silicon through carbonsilicon linkage and containing hydrolyzable substituents directly attached to the silicon, said organic radicals being preferably alkyl, aryl, aralkyl or alkenyl radicals. The hydrolysis products of these organosilanes may be dissolved in strong water-soluble bases to give the corresponding siliconates.

However the water-repellency effects that have been produced by the use of organosilicon compounds and of other agents, although in many cases initially adequate for their intended purpose, are liable to subsequent deterioration under various influences such as when the materials are washed, dry-cleaned or subjected to unfavourable atmospheric conditions. The extent of this deterioration varies according to the nature of the agent used to produce the water-repellent effect and of the material to which it is applied.

The object of the present invention is to obtain improved or more useful water-repellency effects with the aid of organosilicon compounds.

The invention attains this object by a method of treating materials which is characterised by using organosilicon compounds in conjunction with polyfunctional (including difunctional) isocyanates or isothiocyanates or their adducts, more particularly their bisulphite addition compounds.

A wide variety of polyisocyanates and polyisothiocyanates may be usefully employed. The following may be mentioned by way of example: Polymethylene diisocyanates, especially hexamethylene diisocyanate, and the corresponding diisothiocyanates; alkylene diisocyanates, e.g. propylene-1,2-diisocyanate, and the corresponding diisothiocyanates; alkylidene diisocyanates and the corresponding diisothiocyanates; cycloalkylene diisocyanates and the corresponding diisothiocyanates; aromatic and substituted aromatic polyisocyanates, e.g. phenyl-1.4-diisocyanate, metatoluylene diisocyanate, toluene-2.4.6-triisocyanate, chloro-phenylene 2:4 diisocyanate, and the corresponding diisothiocyanates; aliphatic-aromatic polyisocyanates, e.g. p.p'-diphenyl-methane diisocyanate and p.p.'p''-triphenylmethane triisocyanate, and the corresponding polyisothiocyanates. It will be understood that mixtures of polyisocyanates and/or polyisothiocyanates may be used.

There may likewise be employed a wide variety of organosilicon compounds of the kind hereinbefore stated. Amongst the preferred organosilicon compounds are those in which methyl and/or phenyl radicals are linked to silicon through carbonsilicon linkage, and also those in which a hydrogen atom is linked to silicon as in the case of methyl-hydrogenpolysiloxanes. The latter may be employed in admixture with dimethylpolysiloxanes, such as mixtures described in British specification No. 680,265. Branch-chained polysiloxanes may also be used which are produced by the hydrolysis of an organosilane containing three hydrolyzable substituents directly attached to silicon, or by the hydrolysis of a mixture of organosilanes of which at least one has three hydrolyzable substituents, or by the hydrolysis of a mixture containing at least one organosilane and also containing a silicon compound such as silicon tetrachloride which has four hydrolyzable substituents.

The polyisocyanates or polyisothiocyanates or their adducts may be applied to the material prior to, simultaneously with, or after the treatment with the organosilicon compounds. For example, the polyisocyanate or polyisothiocyanate may be applied from solution in an organic solvent, or from vapour or from aqueous emulsion or, in the case of a bisulphite addition compound, from aqueous solution. After the treatment, the solvent or water can be evaporated with or without heat. A final heating or baking step is generally required. The heat treatment will normally be of 3–15 minutes' duration at a temperature of 100° C. to 200° C. but if a lower temperature is used the time necessary will be substantially greater. It will also be possible in some cases to carry out drying and heating simultaneously. The heat treatment may be carried out by any of the conventional methods, but preferably is effected between 125° C. and 180° C. for a few minutes in stenters or hot air chambers or through machines which use infra-red radiation as the source of heat. Alternatively this heat treatment may be effected by passing the material through a bath of molten metal e.g. containing low temperature melting alloys, or less preferably may be effected by treating the material with steam.

The organosilicon compound may then be applied from solution in an organic solvent or from the vapour state or from aqueous emulsion, and the solvent or water removed by evaporation. The treated material may then be heated at an elevated temperature. This heating is unnecessary in the case of some organosilicon compounds especially when used in conjunction with certain catalysts e.g. titanium esters.

Alternatively the procedure in the above case may be reversed and the organosilicon compound applied first.

In either of the two aforesaid specific procedures catalysts may be used to improve the water-repellent effects of the orgnosilicon compounds. Such catalysts may be applied to the material together with the organosilicon compounds or separately at any convenient stage.

Amongst suitable catalysts there may be mentioned zinc octoate; dibutyl tin dilaurate or maleate; zirconium thiocyanate and titanium esters, e.g. butyl titanate, alkanolamine titanates and others mentioned in our U.S. specifications, Serial No. 281,222 and Serial No. 556,780.

Another method of carrying out the invention is to use a single treatment liquor. Thus the polyisocyanate or polyisothiocyanate and the organosilicon compound may be dissolved in a common organic solvent, applied to the substrate material, the solvent evaporated, and the material heat treated.

Where it is more convenient to operate in an aqueous system the orgnosilicon compound in the form of an aqueous emulsion of the polyisocyanate or polyisothiocyanate, or with an equeous solution of the bisulphite addition compound thereof. The mixture is applied to the material, the water evaporated and the material heated to an elevated temperature followed, if necessary, by a rinsing or washing treatment. When using the organosilicon compounds in a single bath with the polyisocyanates or polyisothiocyanates the presence of catalysts may be detrimental, unless the bath is used shortly after being made up, since they may react with the polyisocyanates or polyisothiocyanates. This does not apply to the adducts or addition compounds of the polyisocyanate or polyisothiocyanates because they do not so react.

It will be appreciated that there may be provided for use in the single treatment method a marketable composition comprising a mixture of one or more organosilicon compounds and one or more polyisocyanates or polyisothiocyanates or adducts thereof, which mixture may be, if desired, in the form of a solution or aqueous emulsion. If a catalyst is also included the composition would be such, as will be understood from what has been stated above, as to avoid an undesirable reaction between the catalyst and the isocyanate compound.

It is known that isocyanates produce hydrophobic effects on certain materials, notably textiles, but these effects are in general of a low order unless mono-isocyanates containing aliphatic chains having ten or more carbon atoms are used. In such cases the water repellent effect is largely due to the hydrophobic character of the long carbon chain. However the present invention is not concerned with the use of mono-isocyanates.

The present invention has the unexpected effect of producing, by the conjoint use of the organosilicon compound and the polyisocyanate or polyisothiocyanate, better or more useful-water-repellency effects than can be produced by the use of an equivalent amount of either component alone. In many cases, the degree of water-repellency that can be imparted is so much higher that even though there may be a substantial deterioration after subjection of the material to washing, dry-cleaning, or weathering there still remains a degree of water-repellency which is higher than, or at least comparable with, that imparted initially by the use of an equivalent amount of either component alone. In other cases, which are few and exceptional, where the initial degree of water-repellency may not be comparatively high, there is obtained by the invention the advantage of substantially less subsequent deterioration.

The invention is applicable to textiles that have already been finished in a conventional manner, that is to say the treatment may be applied for example to textiles which contain softening agents, lubricating agents, antiseptics or which have been anticreased or stabilised by means of thermosetting resinous condensates.

The invention may also be applied in some cases by treating before or simultaneously with conventional finishing agents.

The test used for determining the water-repellency of textiles in the following examples is the Bundesmann test also known as Tentative Textile Standard No. 8, 1947, and described in the Journal of the Textile Institute, 1947, volume 38, S. 4. The rate of flow of water according to the test is 65 ml. per minute and the test time 10 minutes. Means are provided in this test for any water passing through the fabric to be collected and measured. Thus two observations are recorded: (a) the resistance to actual wetting as measured by the amount of absorption, e.g. weight increase determination and (b) the penetration i.e. the extent to which the fabric resists passage of water. The test results are the mean of at least two determinations.

The following examples are given for the purpose of illustrating the invention and the results of its performance. Where parts are mentioned they are parts by weight. The "silicone" employed throughout the examples, unless otherwise specified, is a mixture containing 60 percent by weight of trimethylsiloxy end-blocked methylhydrogenpolysiloxane and 40 percent by weight of a trimethylsiloxy end-blocked dimethylpolysiloxane having a viscosity of 12,800 centistokes at 25° C.

*Example 1*

Portions of a satin fabric woven from polyethylene terephthalate fibre are impregnated respectively in the following solutions:

(1) 2.65 g. silicone are dissolved in 95.70 ml. of petroleum spirit (boiling range 130–180° C.) to which has been added 1.65 ml. of a solution of 10 parts of tetrabutyl ortho titanate in 90 parts of the same solvent. After impregnation in this bath the fabric is dried and heated for 4 minutes at 140° C.

(2) The solution prepared as in (1) above, except that the butyl titanate is replaced by zinc octoate. The treatment of the fabric is identical.

(3) 2.65 g. of silicone and 1.5 g. of the polyisocyanate marketed by I.C.I. Limited under the registered trademark Calaroc TC are dissolved in 95.85 ml. of the said petroleum spirit. After impregnation the fabric is treated exactly as in (1) above.

(4) 2 g. octadecyl isocyanate are dissolved in 98 ml. of the said petroleum spirit. The impregnated fabric is then treated exactly as in (1) above.

(5) 2 g. octadecyl isocyanate and 1.5 g. of the polyisocyanate marketed by I.C.I. Limited under the registered trademark Calaroc TC are dissolved in 96.5 ml. of the said petroleum spirit. The impregnated fabric is then treated exactly as in (1) above.

(6) 2.7 g. of stearate chromic chloride already dissolved as a 30% solution in isopropanol are added to 97.3 g. water. The impregnated fabric is dried and heated for 1 hour at 100° C.

(7) A portion of the fabric treated in solution (6) above is further impregnated in a solution containing 1.5 g. of the polyisocyanate marketed by I.C.I. Limited under the registered trademark Calaroc TC in 98.5 ml. of the said petroleum spirit and, after drying, is heated for 4 minutes at 140° C.

The respective portions of treated fabric are mounted on a board and exposed to the weather by placing the board in the open with the fabric facing South and the board at an angle of 45° to the horizontal. After exposure for one month the portions of fabric are tested for residual water-repellency and the results compared with those of the portions of the treated fabric which have not been exposed.

|  | Original | | Weathered | |
| --- | --- | --- | --- | --- |
|  | Absorption, Percent | Penetration, cc. | Absorption, Percent | Penetration, cc. |
| 1. Treated with silicone and butyl titanate | 1 | 23 | 22 | 52 |
| 2. Treated with silicone and zinc octoate | Nil | 28 | 33 | 91 |
| 3. Treated with silicone and polyisocyanate | 3.5 | 28 | 10 | 26 |
| 4. Treated with octadecyl isocyanate | 71.5 | >390 | 106.5 | >390 |
| 5. Treated with octadecyl isocyante and polyisocyanate | 59 | >390 | 98 | >390 |
| 6. Treated with stearate chromic chloride | 27.5 | 81 | 30 | >390 |
| 7. Treated with stearate chromic chloride and polyisocyanate | 16.5 | 83 | 22.5 | >390 |

In the above table when a penetration figure of greater than 390 (>390) is recorded it should be noted that 390 cc. is the capacity of the cup which holds the water penetrating the fabric and when this figure is exceeded it means that the fabric has virtually no resistance to penetration by water. It will be observed from the above table that the polyethylene terephthalate fabric treated with silicone and polyisocyanate is considerably more resistant to weathering than when treated with silicone (without polyisocyanate), whether it be catalysed by butyl titanate or zinc octoate. Moreover, the specificity of the effect of the polyisocyanate on the silicone result is emphasised by the inability of the polyisocyanate to improve the weathering resistance of two other known water-repellent finishing agents, namely octadecyl isocyanate and stearate chromic chloride.

*Example 2*

A dyed cotton gaberdine fabric is impregnated with a solution of 1.875 parts of silicone and 0.125 part of tetrabutyl ortho titanate in 98 parts petroleum spirit (boiling range 130–180° C.). The fabric is dried and heated for 4 minutes at 140° C. A portion of this treated fabric is then impregnated with a solution containing 1.5 parts of polyisocyanate marketed by I.C.I. Limited under the registered trademark Calaroc TC in 98.5 parts of petroleum spirit (boiling range 130–180° C.), dried and heated for 4 minutes at 140° C. When tested for water-repellency they give the following results:

|  | Absorption, Percent | Penetration, cc. |
| --- | --- | --- |
| 1. Treated with silicone | 71 | 1 |
| 2. Treated with silicone and polyisocyanate | 38.6 | 1 |

The results show the marked effect of the polyisocyanate in improving the absorption figure.

A raincoat made from the material treated in the above way showed better retention of showerproofness after wearing for three months in the case of the combined silicone-polyisocyanate treatment than when treated with silicone alone.

*Example 3*

A cotton/wool union fabric containing 20% wool and 80% cotton is treated exactly as in Example 2. The figures obtained for water-repellency are:

|  | Absorption, Percent | Penetration, cc. |
| --- | --- | --- |
| 1. Treated with silicone | 138.5 | 265 |
| 2. Treated with silicone and polyisocyanate | 34 | 73 |

The effect of the polyisocyanate in improving the water-repellency is very marked.

A raincoat made from the material treated with the silicone and polyisocyanate showed better retention of showerproofness after wearing for three months than a similar raincoat made from the material treated with silicone alone.

*Example 4*

A series of solutions is prepared containing, respectively, (a) 2 parts of silicone in 98 parts white spirit; (b) 2 parts of metatoluylene diisocyanate in 98 parts of white spirit; and (c) 1 part metatoluylene diisocyanate and 1 part of silicone in 98 parts of white spirit. Specimens of cotton poplin fabric are impregnated respectively with these solutions, dried and heated at 160° C. for 3 minutes 30 seconds. Further specimens of the same fabric are (d) first impregnated with a solution containing 1 part of the diisocyanate in 99 parts of white spirit, dried and heated at 160° C. for 3 minutes 30 seconds; and secondly impregnated with a solution containing 1 part of the silicone in 99 parts of water spirit, dried and heated at 160° C. for 3 minutes 30 seconds. Portions of each of the several specimens prepared as aforesaid are washed by the standard method known as the Society of Dyers and Colourists No. 2 test for cellulosic materials in which the specimens are washed for 90 minutes in a solution containing 0.2 part of soap in 99.8 parts of water at 60° C. The specimens are then tested by the Bundesmann method and the results below enable a comparison to be made between the initial water-repellency and the water-repellency after washing in each case. The results show the comparatively high degree of water-repellency maintained on washing by the specimens treated according to the invention.

|  | Initial Water-Repellency | | Repellency after Washing | |
| --- | --- | --- | --- | --- |
|  | Absorption, Percent | Penetration, cc. | Absorption, Percent | Penetration, cc. |
| (a) 2% Silicone alone | 56.9 | 3.5 | 67.7 | 7 |
| (b) 2% metatoluylene diisocyanate | 69.5 | 3 | 75.0 | 2.5 |
| (c) 1% metatoluylene diisocyanate and 1% silicone, in one bath | 49.4 | 1 | 51.2 | 2 |
| (d) 1% metatoluylene diisocyanate followed by 1% silicone | 41.7 | 1 | 57.8 | 1 |

*Example 5*

Specimens of a cotton gabardine fabric are respectively impregnated in the following solutions:

(a) 1.875 parts of silicone and 0.125 part of zinc octoate in 98 parts of white spirit.

(b) 2 parts of metatoluylene diisocyanate in 98 parts of white spirit.

(c) 1 part of metatoluylene diisocyanate in 99 parts of white spirit.

The specimens are then heated at 160° C. for 3 minutes 30 seconds. Specimen (c) is then impregnated in a solution of 0.94 part of silicone and 0.06 part of zinc octoate in 99 parts of white spirit, dried, and heated at 160° C. for 3 minutes 30 seconds. Portions of each treated specimen are subjected to the No. 2 washing test as in Example 4 and other portions thereof are subjected to a dry-cleaning test which consists of tumbling the specimens for 15 minutes in white spirit followed by drying. Three successive dry-cleaning tests are carried out. The various specimens are then tested by the Bundesmann method and the results show the improved water-repellency given by the combined treatment according to the invention and the comparatively high degree of water-repellency maintained both after washing and dry-cleaning.

| Treatment | Catalyst | Initial Repellency | | Repellency after Washing | | Repellency after Dry-cleaning | |
|---|---|---|---|---|---|---|---|
| | | Abs., Percent | Pen., cc. | Abs., Percent | Pen., cc. | Abs., Percent | Pen., cc. |
| (a) 2% Silicone (including catalyst) | zinc octoate | 62.2 | 2 | 88.7 | 9.5 | 73.3 | 1 |
| (b) 2% metatoluylene diisocyanate | None | 82.1 | 7.5 | 97.0 | 6.9 | 113.1 | 163 |
| (c) 1% metatoluylene diisocyanate followed by 1% silicone (including catalyst) | zinc octoate | 48.1 | 2 | 73.6 | 9 | 62.3 | 1 |

Example 6

A similar series of specimens are prepared as in Example 5, with the exception that the metatoluylene diisocyanate is replaced by diphenyl methane diisocyanate.

| Treatment | Catalyst | Initial Repellency | | Repellency after Washing | | Repellency after Dry-cleaning | |
|---|---|---|---|---|---|---|---|
| | | Abs., Percent | Pen., cc. | Abs., Percent | Pen., cc. | Abs., Percent | Pen., cc. |
| (a) 2% Silicone (including catalyst) | zinc octoate | 62.2 | 2 | 88.7 | 9.5 | 75.3 | 1 |
| (b) 2% Diphenyl methane diisocyanate | None | 89.4 | 36.5 | 84.5 | 32.5 | 98.6 | 114 |
| (c) 1% Diphenyl methane diisocyanate followed by 1% silicone (including catalyst). | zinc octoate | 37.8 | 1 | 61.8 | 1 | 52.4 | 1 |

Example 7

A similar series of specimens are prepared as in Example 5, with the exception that the metatoluylene diisocyanate is replaced by the same amount of triphenyl methane triisocyanate. The comparative Bundesmann test results again show the improvement achieved by the combined treatment according to the invention.

| Treatment | Catalyst | Initial Repellency | | Repellency after Washing | | Repellency after Dry-cleaning | |
|---|---|---|---|---|---|---|---|
| | | Abs., Percent | Pen., cc. | Abs., Percent | Pen., cc. | Abs., Percent | Pen., cc. |
| (a) 2% Silicone (including catalyst) | zinc octoate | 62.2 | 2 | 88.7 | 9.5 | 75.3 | 1 |
| (b) 2% Triphenyl methane triisocyanate | None | 101.8 | 113 | 88.1 | 31.5 | 104.1 | 157 |
| (c) 1% Triphenyl methane triisocyanate followed by 1% silicone (including catalyst). | zinc octoate | 48.6 | 1 | 75.3 | 1.5 | 59.2 | 1 |

Example 8

A similar series of specimens of cotton poplin are prepared as in Example 5 with the exception that the metatoluylene diisocyanate is replaced by the same amount of hexamethylene diisocyanate. The comparative Bundesmann test results again show the superiority of the combined process of the invention.

| Treatment | Catalyst | Initial Repellency | | Repellency after Washing | | Repellency after Dry-cleaning | |
|---|---|---|---|---|---|---|---|
| | | Abs., Percent | Pen., cc. | Abs., Percent | Pen., cc. | Abs., Percent | Pen., cc. |
| 2% silicone (including catalyst) | zinc octoate | 46.8 | 1 | 64.3 | 2 | 56.9 | 1 |
| 2% hexamethylene diisocyanate | none | 80.8 | 11 | 78.7 | 16 | 77.1 | 21 |
| 1% hexamethylene diisocyanate followed by 1% silicone (including catalyst) | zinc octoate | 30.7 | 1 | 53.0 | 1 | 47.9 | 5 |

Example 9

Specimens of cotton/wool union gaberdine fabric are treated respectively, in solutions containing:

(a) 1.875 parts of silicone and 0.125 part of dibutyl tin dilaurate in 98 parts of white spirit.

(b) 2 parts diphenyl methane diisocyanate in 98 parts of white spirit.

(c) 1 part diphenyl methane diisocyanate in 99 parts of white spirit.

The specimens are then dried and heated at 150° C., for 3 minutes 20 seconds. Specimen (c) is then impregnated with a solution of 0.94 part of silicone and 0.06 part of dibutyl tin dilaurate in 99 parts of white spirit. The specimen is then dried and heated at 150° C. for 3 minutes 20 seconds. The Bundesmann test results show a striking improvement in the water-repellency given by the combined treatment of the invention and the improved extent to which it is maintained after washing and dry-cleaning.

| Treatment | Catalyst | Initial Repellency | | Repellency after Washing | | Repellency after Dry-cleaning | |
|---|---|---|---|---|---|---|---|
| | | Abs., Percent | Pen., cc. | Abs., Percent | Pen., cc. | Abs., Percent | Pen., cc. |
| (a) 2% Silicone (including catalyst) | dibutyl tin dilaurate. | 88.4 | 23.5 | 83.4 | 4 | 80 | 22.5 |
| (b) 2% diphenyl methane diisocyanate | none | 123.5 | 75.5 | 83.5 | 2 | 142.5 | 201 |
| (c) 1% diphenyl methane diisocyanate followed by 1% silicone (including catalyst). | dibutyl tin dilaurate. | 27.4 | 4.5 | 62.1 | 3 | 43.5 | 4 |

*Example 10*

Specimens of a cotton/wool union gaberdine are respectively impregnated with:

(a) A solution of 2 parts of metatoluylene diisocyanate in 98 parts of white spirit.

(b) An emulsion containing 95.6 parts of water, 2 parts of Silicone Fluid M470 (I.C.I. Ltd.) and 2.4 parts of a solution prepared by dissolving 367 parts of zirconium oxychloride and 115 parts of ammonium thiocyanate in 518 parts of water.

(c) A solution of 1 part of metatoluylene diisocyanate in 99 parts of white spirit.

The impregnated specimens are dried and heated for 3 minutes 20 seconds at 150° C. Specimen (c) is then impregnated with an emulsion prepared by diluting 50 parts of the emulsion prepared as in (b) with 50 parts of water. The specimen (c) is then dried and heated for 3 minutes 20 seconds at 150° C. The comparative specimens so produced are tested by the Bundesmann test and the results are as follows:

| Treatment | Initial Repellency | | Repellency after washing | |
|---|---|---|---|---|
| | Abs., percent | Pen., cc. | Abs., percent | Pen., cc. |
| (a) 2% metatoluylene diisocyanate | 125.4 | 132 | 101.2 | 42 |
| (b) 2% silicone | 101.9 | 4 | 168.8 | 201 |
| (c) 1% metatoluylene diisocyanate followed by 1% silicone | 92.6 | 12 | 99.0 | 7 |

*Example 11*

An emulsion of silicone is prepared by agitating a solution of 3.1 parts of cetyl dimethyl benzyl ammonium chloride and 0.1 part of acetic acid in 11.4 parts of water and adding 61.9 parts of a solution of silicone in white spirit containing 65 parts of silicone per 100 parts of solution. After passing this mixture through a colloid mill a further 23.5 parts of water are mixed in to give 100 parts of an emulsion containing 40 parts of silicone.

Specimens of a wool/cotton union gaberdine are impregnated, respectively, with the following.

(a) A solution of 2 parts of metatoluylene diisocyanate in 98 parts of white spirit.

(b) An emulsion of 2 parts of silicone per 100 parts of emulsion prepared by diluting with water the stock emulsion prepared as above.

(c) 1 part of metatoluylene diisocyanate in 99 parts of white spirit.

The specimens are dried and heated at 150° C. for 3 minutes 20 seconds. Specimen (c) is then impregnated with an emulsion containing 1 part of silicone per 100 parts of emulsion prepared by diluting the stock emulsion. The specimen is then dried and heated at 150° C. for 3 minutes 20 seconds. The specimens are then tested by the Bundesmann method and give the following results.

| Treatment | Initial Repellency | | Repellency after washing | | Repellency after Dry-cleaning | |
|---|---|---|---|---|---|---|
| | Abs., percent | Pen., cc. | Abs., percent | Pen., cc. | Abs., percent | Pen., cc. |
| (a) 2% metatoluylene diisocyanate | 125.4 | 132 | 101.2 | 42 | 136.6 | 224 |
| (b) 2% silicone | 110.8 | 48 | 109.9 | 20 | 117.1 | 95 |
| (c) 1% metatoluylene diisocyanate followed by 1% silicone | 82.6 | 9 | 95.2 | 15 | 107.8 | 73 |

*Example 12*

Specimens of a nylon poplin fabric are respectively impregnated with the following:

(a) A solution of 2 parts of the addition compound of hexa-methylene diisocyanate with sodium bisulphite, prepared according to the method of Petersen, Annalen, vol. 562, page 205 (1949), in 98 parts of water;

(b) An aqueous emulsion containing 2 parts of silicone and 0.2 part of zinc octoate in 100 parts of emulsion;

(c) An aqueous emulsion prepared as (b) but also containing 1 part of the hexamethylene diisocyanate bisulphite compound at the expense of 1 part of water.

The treated specimens are then dried and heated for 4 minutes at 140° C. Each specimen is rinsed in running water for 75 minutes to remove undesirable soluble components and finally dried.

| Treatment | Absorption, percent | Penetration, cc. |
|---|---|---|
| (a) 2% hexamethylene diisocyanate sodium bisulphite addition compound | 77.9 | >390 |
| (b) 2% silicone | 25.8 | 2 |
| (c) 2% silicone and 1% of the hexamethylene diisocyanate sodium bisulphite addition compound | 7.0 | 1 |

These results show that addition of the addition compound of the isocyanate with sodium bisulphite, which of itself has no water-repellent properties, to a silicone emulsion increases greatly the water-repellent effect obtained.

Example 13

Specimens of cotton poplin are respectively impregnated with the following solutions:

(a) 2 parts of metatoluylene diisocyanate in 98 parts of white spirit;

(b) 1.875 parts of a phenyl methyl silicone resin and 0.125 part butyl titanate in 98 parts of white spirit;

(c) 1 part of metatoluylene diisocyanate and 0.0937 part of the phenyl methyl silicone resin and 0.063 part of butyl titanate in 98 parts of white spirit; and solvent removed in a current of air.

The treated specimens are heated for 3 minutes 30 seconds at 160° C. Portions of the fabrics are respectively washed and dry-cleaned as described in Example 5 and tested for water-repellency by the Bundesmann test.

| Treatment | Initial water repellency | | After washing | | After Dry-cleaning | |
|---|---|---|---|---|---|---|
| | Abs., percent | Pen., cc. | Abs., percent | Pen., cc. | Abs., percent | Pen., cc. |
| (a) 2% metatoluylene diisocyanate | 76.3 | 32 | 66.9 | 2 | 90.6 | 35 |
| (b) 2% phenyl methyl silicone resin (including catalyst) | 77.7 | 2 | 96.1 | 27 | 87.5 | 37 |
| (c) 1% metatoluylene diisocyanate and 1% phenyl methyl silicone resin (including catalyst) | 64.4 | 6 | 59.2 | 1 | 72.0 | 15 |

Example 14

A specimen of cotton poplin fabric is impregnated with a solution of 2 parts of sodium methyl siliconate in 98 parts of water, dried, acidulated in a solution of 2 parts of glacial acetic acid in 98 parts of water and again dried. Another specimen of the same fabric is impregnated with a solution containing 1 part of metatoluylene diisocyanate in 99 parts of white spirit and dried. This other treated specimen is then impregnated with a solution of one part of sodium methyl siliconate in 99 parts of water, dried, acidulated in a solution of 1 part of glacial acetic acid in 99 parts of water and again dried. After drying, each specimen is heated for 3 minutes 30 seconds at 160° C. and finally washed and rinsed. Bundesmann test results show the superiority of the combined process according to the invention.

| Treatment | Absorption, percent | Penetration, cc. |
|---|---|---|
| 2% sodium methyl siliconate | 92.7 | 22 |
| 1% metatoluylene diisocyanate and 1% sodium methyl siliconate | 62.3 | 0 |

Example 15

Specimens of a cellulose acetate poult fabric are respectively impregnated with the following solutions:

(a) 2.812 parts of silicone and 0.188 part of butyl titanate in 97 parts of white spirit;

(b) 1 part of metatoluylene diisocyanate in 99 parts of white spirit; and (c) 3 parts of metatoluylene diisocyanate in 97 parts of white spirit.

The specimens are dried. Specimen (b) is heated for 3 minutes 30 seconds at 160° C. and is then impregnated with a solution containing 1.875 parts of silicone and 0.125 part of butyl titanate in 98 parts of white spirit and dried. All three specimens are given a final heating treatment for 2 minutes at 160° C. The specimens are then cut into two portions, one portion being exposed to the weather for 1 month. The specimens are then subjected to the Bundesmann test and the following results are obtained:

| Treatment | Original | | Weathered | |
|---|---|---|---|---|
| | Absorption, percent | Penetration, cc. | Absorption, percent | Penetration, cc. |
| (a) 2.812% silicone and 0.188 butyl titanate | 26.2 | 1 | 51.9 | 3 |
| (b) 1% metatoluylene diisocyanate followed by 1.875% silicone and 0.125% butyl titanate | 17.8 | 1 | 33.5 | 2 |
| (c) 3% metatoluylene diisocyanate | 50.1 | 0 | 78.8 | 24 |

These results demonstrate the improved effect obtained by the combined treatment according to the invention and also the good maintenance of the effect after one month's exposure to the weather.

Example 16

Specimens of a viscose rayon staple fibre gaberdine fabric are respectively treated with the silicone and isocyanate solutions exactly as in Example 15 except that the final heating treatment given to all three specimens is for 3 minutes 30 seconds at 160° C. Portions of the specimens are washed in a soap solution containing 0.2 parts of soap in 98.8 parts of water for 90 minutes at 60° C. and well rinsed. After drying the washed specimens are tested by the spray test of the American Standards Association as described in the 1954 edition of the Technical Manual and Year Book of the American Association of Textile Chemists and Colourists, vol. XXX, page 136. The results were:

Spray rating
(a) 2.812% silicone and 0.188 butyl titanate _____ 70
(b) 1% metatoluylene diisocyanate followed by 1.875% silicone and 0.125% butyl titanate __ 100
(c) 3% metatoluylene diisocyanate _____ 50

These results show the marked improvement given by the combined treatment according to the invention.

Example 17

Specimens of cotton poplin fabric are respectively impregnated with the following solutions:

(a) 2 parts of silicone sold as "Drisil" 2205 (Midland Silicones Limited) in 98 parts of white spirit;

(b) 2 parts of metatoluylene diisocyanate in 98 parts of white spirit; and (c) 1 part of metatoluylene diisocyanate, and 1 part of Drisil 2205 in 98 parts of white spirit.

The specimens are dried. Specimen (c) is heated for 3 minutes 30 seconds at 160° C. and then impregnated with 2 parts of the silicone from "Drisil" 2205. Finally all specimens are heated for 3 minutes 30 seconds at 160° C. Portions of each specimen are dry-cleaned for 15 minutes in white spirit. The specimens are then tested for water absorption by the Bundesmann test.

| Treatment | Original Absorption, Percent | After dry-cleaning Absorption, Percent |
|---|---|---|
| (a) 2% silicone from "Drisil" 2205 | 54.6 | 79.3 |
| (b) 2% metatoluylene diisocyanate | 125.4 | 136.6 |
| (c) 1% metatoluylene diisocyanate followed by 1% silicone from "Drisil" 2205 | 25.3 | 56.5 |

These results show the improved effect obtained by the combined process of the invention and a fairly good maintenance of the effect after dry-cleaning.

Example 18

Specimens of typing paper of thickness 0.005 inch are respectively passed through the following solutions:

(a) 2.812 parts of silicone and 0.188 part butyl titanate in 97 parts of white spirit;

(b) 1 part of metatoluylene diisocyanate in 99 parts of white spirit;

(c) 3 parts of metatoluylene diisocyanate in 97 parts of white spirit; and are dried in a current of air at 80° C. Specimen (b) is heated for 3 minutes 30 seconds at 160° C. and then passed through a solution of 1.875 parts of silicone and 0.125 part butyl titanate in 98 parts of white spirit and dried. Finally all specimens are heated for 3 minutes 30 seconds at 160° C. Assessment of water repellency is made by using the spray rating test referred to in Example 16. Test specimens are compared with a specimen of untreated paper.

Spray rating
(a) 3% silicone (including catalyst) _____ 70
(b) 1% metatoluylene diisocyanate and 2% silicone (including catalyst) _____ 80
(c) 3% metatoluylene diisocyanate _____ 50
(d) No treatment _____ 50

These results show that the isocyanate treatment alone produces no improvement in repellency and that the combined treatment according to the invention gives the best result.

Example 19

An absorbent wash leather is treated in this example. It is such as is found to pick up 165 parts of white spirit per 100 parts of leather after impregnation and mangling. Test solutions are prepared containing (a) 2 parts of silicone and 2 parts of butyl titanate in 161 parts of white spirit; (b) 2 parts of metatoluylene diisocyanate in 163 parts of white spirit; and (c) 4 parts of metatoluylene diisocyanate in 161 parts of white spirit.

Specimens of the leather are impregnated with the solutions and dried in a current of warm air. The specimen which was impregnated in solution (b), and dried, is then impregnated with a solution of 1 part of silicone and 1 part of butyl titanate in 163 parts of white spirit, and again dried in a current of warm air. The temperature of drying does not exceed 80° C.

The three resultant specimens, hereinafter called (a), (b) and (c) to identify them respectively with the solutions with which they were originally impregnated as denoted above, are then immersed for 5 minutes in water at 25° C. The specimen (c) is completely soaked, whilst specimen (b), treated according to the invention, shows markedly less water absorption than specimen (a).

Example 20

Specimens of a wool felt are treated in a manner similar to the leather specimens referred to in Example 19 except that the heat treatment is for 5 minutes at 150° C. The specimens are subjected to the Bundesmann test and the following absorption figures are obtained:

| Treatment | Absorption, Percent |
|---|---|
| (a) 3% silicone | 177 |
| (b) 1% metatoluylene diisocyanate and 2% silicone | 135.7 |
| (c) 3% metatoluylene diisocyanate | 315 |

An improved result is thus obtained with the combined process of the invention.

Example 21

A specimen of cellulose acetate sheet is dipped in a solution of 1 part metatoluylene diisocyanate in 99 parts of carbon tetrachloride and the solvent is allowed to evaporate in the air. The specimen is heated for 5 minutes at 150° C. It is then dipped in a solution containing 2 parts of a methyl silicone resin, having a ratio of methyl groups to silicon atoms of 1.5:1, in 98 parts of carbon tetrachloride and, after evaporating the solvent, is again heated for 5 minutes at 150° C. A second specimen of cellulose acetate is dipped in a solution containing 1 part of metatoluylene diisocyanate and 2 parts of the methyl silicone resin in 97 parts of carbon tetrachloride and, after evaporating the solvent, is heated for 5 minutes at 150° C. For comparison, specimens of cellulose acetate sheet are treated in the same way with (a) solution of 3 parts metatoluylene diisocyanate in 97 parts of carbon tetrachloride and (b) a solution of 3 parts of the methyl silicone resin in 97 parts of carbon tetrachloride.

Of the four specimens, only the two treated with both the isocyanate and the silicone are highly water repellent as revealed by measuring the angles of contact between their surfaces and distilled water.

CELLULOSE ACETATE SHEET

| Treatment | Angle of contact, degree |
|---|---|
| (a) 3% metatoluylene diisocyanate | 76 |
| (b) 3% silicone | 63 |
| (c) 1% metatoluylene diisocyanate followed by 2% silicone | 108 |
| (d) 1% metatoluylene diisocyanate and 2% silicone | 103 |

Example 22

A specimen of regenerated cellulose film is dipped in a solution of 1 part of metatoluylene diisocyanate in 99 parts of carbon tetrachloride. The solvent is allowed to evaporate in the air and the film is heated for 5 minutes at 150° C. It is then dipped in a solution containing 2 parts of silicone in 98 parts of carbon tetrachloride, dried and again heated for 5 minutes at 150° C. For comparison, similar specimens are likewise treated with, respectively, a solution of 3 parts of metatoluylene diisocyanate in 97 parts of carbon tetrachloride, and a solution of 3 parts of silicone in 97 parts of carbon tetrachloride.

Measurement of the angles of contact between distilled water and the treated specimens shows that the treatment with both the isocyanate and the silicone produces the most hydrophobic surface.

REGENERATED CELLULOSE FILM

| Treatment | Angle of contact, degree |
|---|---|
| (a) 3% metatoluylene diisocyanate | 78 |
| (b) 3% silicone | 66 |
| (c) 1% metatoluylene diisocyanate followed by 2% silicone | 110 |

Example 23

A specimen of polyethylene terephthalate film is treated with 1% metatoluylene diisocyanate and then with 2% silicone exactly as described in Example No. 22. This treatment confers a high degree of water repellency.

Alternatively, polyethylene terephthalate film may be made highly water-repellent by treating with metatoluylene diisocyanate and then with methyl silicone resin, or with 1% metatoluylene diisocyanate and 2% methylsilicone resin together, exactly as described in Example No. 21.

Example 24

A specimen of clean glass sheet is dipped in a solution containing 1 part of metatoluylene diisocyanate in 99 parts of carbon tetrachloride and the solvent is allowed to evaporate in the air. The specimen is then heated for 5 minutes at 160° C. It is then dipped in a solution of 1.5 parts silicone and 0.5 part of butyl titanate in 98 parts of carbon tetrachloride and, after evaporating the solvent, is again heated for 5 minutes at 150° C. A high degree of water repellency is thereby imparted to the glass.

What is claimed is:

1. A method of rendering material water repellent comprising contacting said material with both (1) at least one organosilicon compound selected from the group consisting of the product obtainable by hydrolysis of hydrolyzable organosilanes containing organic groups linked to the silicon through carbon-silicon linkage and containing hydrolyzable substituents directly attached to silicon and (2) at least one isocyanate compound selected from the group consisting of polyisocyanates, polyisothiocyanates and adducts thereof, said compounds having organic radicals directly linked to isocyanate groups by C–N linkages.

2. The method of claim 1 in which said hydrolyzable organosilanes contain, linked to the silicon through carbon-silicon linkage, organic radicals selected from the group consisting of alkyl, aryl, aralkyl and alkenyl radicals.

3. The method of claim 1 in which the organosilicon compound contains, linked to the silicon through carbon-silicon linkage, organic radicals selected from the group consisting of methyl and phenyl radicals.

4. The method of claim 1 in which said organosilicon compound is a branch-chained polysiloxane.

5. The method of claim 1 in which the organosilicon compound and the isocyanate compound are separately applied to the material.

6. The method of claim 5 in which a catalyst, which is a metal compound, for the organosilicon compound is also applied to said material.

7. The method of claim 6 in which the catalyst is a titanium ester.

8. The method of claim 1 in which the organosilicon compound and the isocyanate compound are simultaneously applied to said material.

9. The method of claim 8 in which a catalyst is present and the isocyanate compound is formed in situ by decomposition of an isocyanate addition compound.

10. The method of claim 9 in which said adduct is a polyisocyanate-bisulphite addition compound.

11. The method of claim 1 in which the isocyanate compound is a polyisocyanate-bisulphite addition compound.

12. The method of claim 1 in which said material is heated after having been contacted with said organosilicon compound and said isocyanate compound.

13. The method of claim 1 in which said material is heated at a temperature of 100° C. to 200° C. for a period of from a few seconds to 30 minutes after having been contacted with said organosilicon compound and said isocyanate compound.

14. A method of rendering material water repellent comprising contacting said material with both a methylhydrogenpolysiloxane and an isocyanate compound selected from the group consisting of polyisocyanates, polyisothiocyanates, and adducts thereof, said compounds having organic radicals directly linked to isocyanate groups by C–N linkages.

15. The method of rendering material water repellent comprising contacting said material with both (1) a mixture of a methylpolysiloxane and a methylhydrogenpolysiloxane and (2) at least one isocyanate compound selected from the group consisting of polyisocyanates, polyisothiocyanates and adducts thereof, said compounds having organic radicals directly linked to isocyanate groups by C–N linkages.

16. The method of rendering material water repellent comprising contacting said material with both (1) a mixture of from 20 to 70% by weight of a methylpolysiloxane containing between 2 and 2.1 methyl radicals per silicon atom and having a viscosity at 25° C. of at least 1,000 cs. and less than 100,000 cs., and from 80 to 30% by weight of a methylhydrogenpolysiloxane containing between 1.0 and 1.5 methyl radicals and between 0.75 and 1.25 hydrogen atoms bonded to silicon per silicon atom, there being a total of between 2 and 2.25 methyl radicals plus hydrogen atoms per silicon atom, and (2) at least one isocyanate compound selected from the group consisting of polyisocyanates, polyisothiocyanates and adducts thereof, said compounds having organic radicals directly linked to isocyanate groups by C–N linkages.

17. A method of rendering material water repellent comprising contacting said material with both (1) at least one organosilicon compound selected from the group consisting of the products obtainable by hydrolysis of hydrolyzable organosilanes containing organic groups linked to the silicon through carbon-silicon linkage and containing hydrolyzable substituents directly attached to silicon and (2) at least one isocyanate compound selected from the group consisting of polymethylene diisocyanates and diisothiocyanates, alkylene diisocyanates and diisothiocyanates, alkylidene diisocyanates and diisothiocyanates, cycloalkylene diisocyanates and diisothiocyanates, aromatic and substituted aromatic polyisocyanates and polyisothiocyanates, and aliphatic aromatic polyisocyanates and polyisothiocyanates.

References Cited in the file of this patent

UNITED STATES PATENTS

| | | |
|---|---|---|
| 2,225,661 | Schirm | Dec. 24, 1940 |
| 2,284,895 | Hanford | June 2, 1942 |
| 2,306,222 | Patnode | Dec. 22, 1942 |
| 2,494,920 | Warrick | Jan. 17, 1950 |
| 2,511,310 | Upson | June 13, 1950 |
| 2,532,559 | Klein | Dec. 5, 1950 |
| 2,550,205 | Speier | Apr. 24, 1951 |
| 2,588,366 | Dennett | Mar. 11, 1952 |
| 2,723,987 | Speier | Nov. 15, 1955 |
| 2,769,732 | Boyd | Nov. 6, 1956 |